United States Patent [19]
Morin et al.

[11] Patent Number: 5,892,813
[45] Date of Patent: Apr. 6, 1999

[54] MULTIMODAL VOICE DIALING DIGITAL KEY TELEPHONE WITH DIALOG MANAGER

[75] Inventors: Philippe R. Morin; Ted H. Applebaum; Jean-Claude Junqua, all of Santa Barbara, Calif.

[73] Assignee: Matsushita Electric Industrial Co., Ltd., Osaka, Japan

[21] Appl. No.: 723,913

[22] Filed: Sep. 30, 1996

[51] Int. Cl.⁶ ..................................................... H04M 1/00
[52] U.S. Cl. ..................................... 379/88.01; 379/93.17
[58] Field of Search ................................. 379/67, 88, 89, 379/90.01, 419, 67.1, 88.01, 88.16, 93.17; 704/239, 240, 241, 243, 251, 254

[56] References Cited

U.S. PATENT DOCUMENTS

| | | | |
|---|---|---|---|
| 4,644,107 | 2/1987 | Clowes et al. .......................... | 379/354 |
| 4,928,302 | 5/1990 | Kaneuchi et al. ....................... | 379/88 |
| 4,945,557 | 7/1990 | Kaneuchi et al. ....................... | 379/67 |
| 5,007,081 | 4/1991 | Schmuckal et al. ..................... | 379/354 |
| 5,684,925 | 11/1997 | Morin et al. .......................... | 395/2.63 |
| 5,737,392 | 4/1998 | Cheng et al. .......................... | 379/67 |

*Primary Examiner*—Scott L. Weaver
*Attorney, Agent, or Firm*—Harness, Dickey & Pierce P.L.C.

[57] ABSTRACT

The multimodal telephone prompts the user using both a visual display and synthesized voice. It receives user input via keypad and programmable soft keys associated with the display, and also through user-spoken commands. The voice module includes a two stage speech recognizer that models speech in terms of high similarity values. A dialog manager associated with the voice module maintains the visual and verbal systems in synchronism with one another. The dialog manager administers a state machine that records the dialog context. The dialog context is used to ensure that the appropriate visual prompts are displayed—showing what commands are possible at any given point in the dialog. The speech recognizer also uses the dialog context to select the recognized word candidate that is appropriate to the current context.

13 Claims, 14 Drawing Sheets

Figure 4

| Read-Only Memory | Read/Write Memory |
|---|---|
| • Speaker-Independent Commands<br>• Phone Models (for recognizer)<br>• Static Prompts | • Speaker-Dependent Commands<br>• Speaker-Dependent Names and Associated Telephone Numbers<br>• Dynamic Prompts |

MULTIMODAL VOICE DIALING DIGITAL KEY TELEPHONE WITH DIALOG MANAGER

BACKGROUND AND SUMMARY OF THE INVENTION

The present invention relates generally to digital telephones and telephone systems, such as private branch exchange (PBX) systems. More particularly the invention relates to a multimodal telephone that provides both voice and touchpad control through an integrated system employing speech recognition and speech generation together with optical display such as an LCD panel. The user communicates with the telephone to perform voice dialing and other system control functions by interacting with the integrated dialog manager that ensures the voice mode and visual/touchpad mode remain synchronized.

The telephone has evolved quite considerably since Alexander Graham Bell. Today, complex telephone stations connect to sophisticated switching systems to perform a wide range of different telecommunication functions. Indeed, the modern-day telephone device has become so sophisticated that the casual user needs an instruction manual to be able to operate it. The typical modern-day telephone device features a panoply of different function buttons, including a button to place a conference call, a button to place a party on hold, a button to flash the receiver, a button to select different outside lines or extensions and buttons that can be programmed to automatically dial different frequently called numbers. Clearly, there is a practical limit to the number of buttons that may be included on the telephone device, and that limit is rapidly being approached.

It has been suggested that voice operated telephones may provide the answer. With a sufficiently robust speech recognizer, the telephone could, in theory, be controlled entirely by voice. It is doubtful that such a device could be successfully achieved using today's technology; simply incorporating speech recognition into the telephone would not result in a device that is easy to use.

Anyone who has been caught in the endless loop of a voice mail system will understand why voice control of the telephone is a significant challenge. It is difficult to offer the telephone user a wide assortment of control functions and operations when those options are prompted by speech synthesis and must be responded to by voice. The user typically has difficulty remembering all of the different choices that are possible and difficulty remembering what the precise commands are to invoke those operations. Also, speech recognizers will occasionally misinterpret a user's command, resulting in the need to abort the command or enter it again. If the user's speech differs significantly from the model on which the recognizer has been trained, the recognizer may also fail to recognize the abort command. When this happens the system may execute an unwanted command, causing user frustration and inconvenience.

The problem is compounded when voice dialing is desired, because voice dialing significantly increases the size of the dictionary of words that must be recognized. Essentially, every new name that is added to the phone directory becomes another word that must be properly interpreted by the recognizer.

The present invention solves the problem with a new approach that integrates voice prompts, visual prompts, spoken commands and push button commands so that the user always has a choice. The telephone includes a dialog manager that monitors the user's spoken commands and push button commands, maintaining both modes in synchronism at all times. The result is a natural, easy-to-use system that does not require an extensive user's manual. The dialog manager displays the commands that are possible, which the user can select by pressing the soft key buttons on the keypad adjacent the visual display or by speaking the commands into the handset. The soft key buttons are push buttons whose function changes according to the state of the dialog. The current function of the soft key button is indicated on the visual display adjacent the button. As the user is first learning the system the visual display provides convenient prompts so that the user will always know what commands are possible at any given time. As the user begins to learn these commands he or she may choose to simply enter them by speaking into the handset, without even looking at the visual display. Of course, even the experienced user may occasionally choose to use the soft key push buttons—when the user cannot use the spoken commands or when entering an abort command to cancel an earlier command that was misinterpreted by the recognizer.

The preferred embodiment of the telephone system is implemented in a modular way, with the voice recognition and synthesis functions as well as the dialog manager being disposed on a circuit card that plugs into a separate card supporting the touchpad, soft keys and visual display functions. The preferred architecture allows the telephone to be manufactured either with or without voice capability or the sophisticated dialog manager. Later, these features can be added to the telephone by simply plugging in the voice card.

By way of summary, the multimodal telephone of the invention comprises a telephone unit having a microphone and a speaker for supporting voiced communication by a user. The microphone and speaker may be incorporated into the handset of the telephone unit according to conventional practice, or they may be separate from the handset. A visual display device is disposed on the telephone unit, the display being adapted for displaying a plurality of different command prompts to the user. The presently preferred embodiment employs a multiline liquid crystal display (LCD) for this purpose. The multimodal telephone further comprises at least one programmable function key for entry of keyed commands by the user. The function key is disposed on the telephone unit adjacent the visual display, so that at least a portion of the command prompts are displayed approximately adjacent the function key. The preferred embodiment uses several such function keys, with adjacent command prompts defining the current function of the key.

A speech module is disposed in the telephone unit. The speech module includes a voice recognizer and a speech generator or synthesizer. The speech module is coupled to the telephone unit so that the voice recognizer is responsive to voiced commands entered through the microphone, and the speech synthesizer provides audible prompts through the speaker.

The multimodal telephone further comprises a dialog manager coupled to the visual display as well as to the function keys and the speech module. The dialog manager defines a hierarchically arranged set of control function states. Each state is associated with one of the command prompts and at least a portion of the states are further associated with one of the audible prompts. The dialog manager is responsive to the voiced commands, and also to the function keys, to traverse the hierarchically arranged set of control function states and select one of the control function states as the active state.

The dialog manager is operative to maintain synchronism between the command prompts and the audible prompts.

The dialog manager is also operative to maintain synchronism between voiced commands and keyed commands, so that the state hierarchically adjacent to the active state is displayed as a command prompt and the user has the option to move from the active state to the hierarchically adjacent state by either voiced command or keyed command.

For a more complete understanding of the invention, its objects and advantages, reference may be had to the following specification and drawings and to the pseudocode listing in the Appendix.

BRIEF DESCRIPTION OF THE DRAWINGS

FIG. 4 is a diagram showing the data stored in the telephone database shown in FIG. 3;

DETAILED DESCRIPTION

Figure 1:
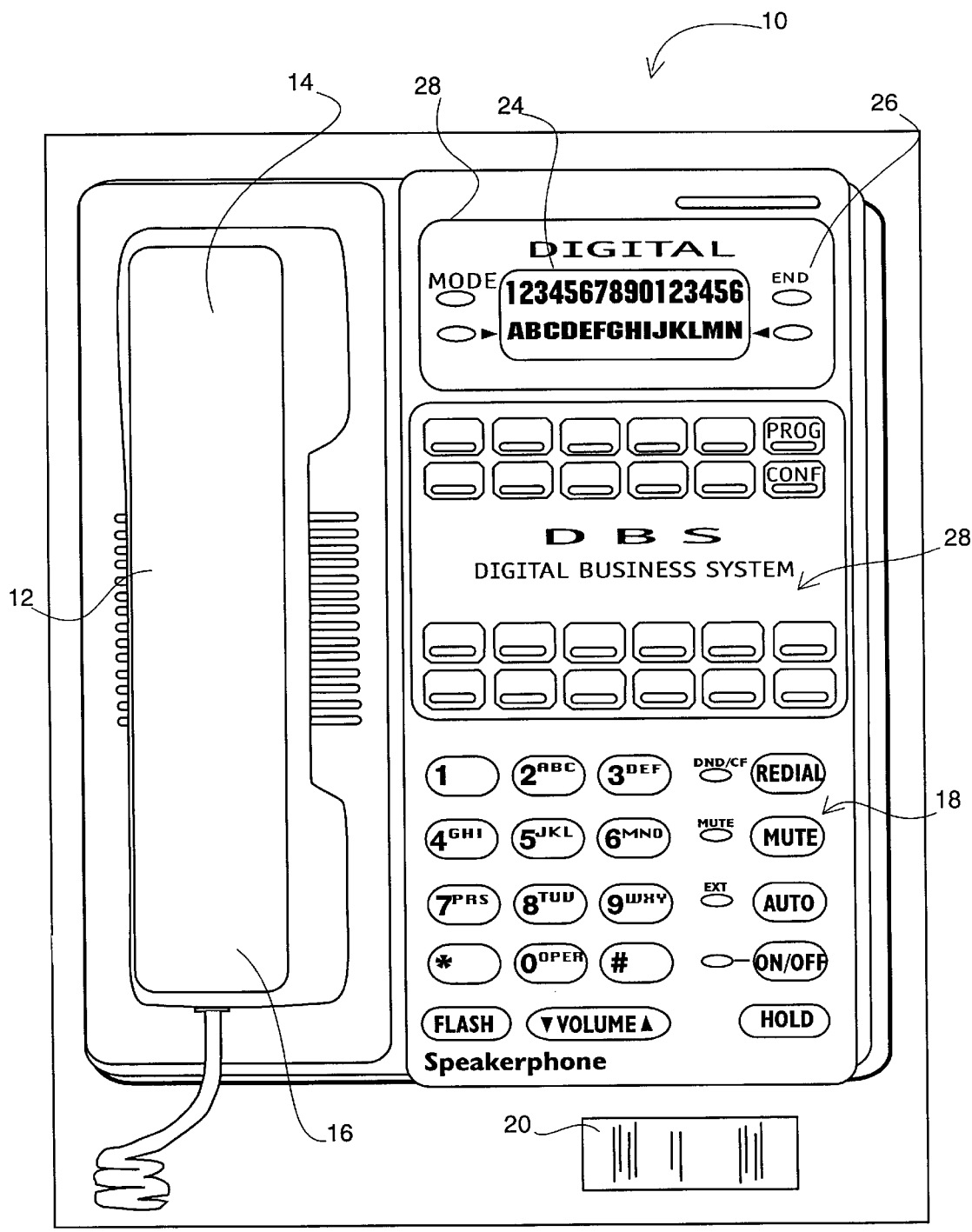
FIG. 1 is an elevation view of a multimodal voice dialing digital telephone according to a preferred embodiment.

A multimodal voice dialing digital telephone according to a preferred embodiment of the present invention is shown generally at 10. The telephone 10 is of the type manufactured by Matsushita Electric Industrial Company, Ltd. and includes a handset 12 with a speaker 14 and a mouthpiece microphone 16. The telephone also includes a keypad 18 for entering alphanumeric data into the phone, as is well known in the telephonic art. A two way transceiver 20 located below the key pad allows hands free two way communication between a telephone user (not shown) and the telephone, as is also well known in the telephonic art.

Figure 2A:
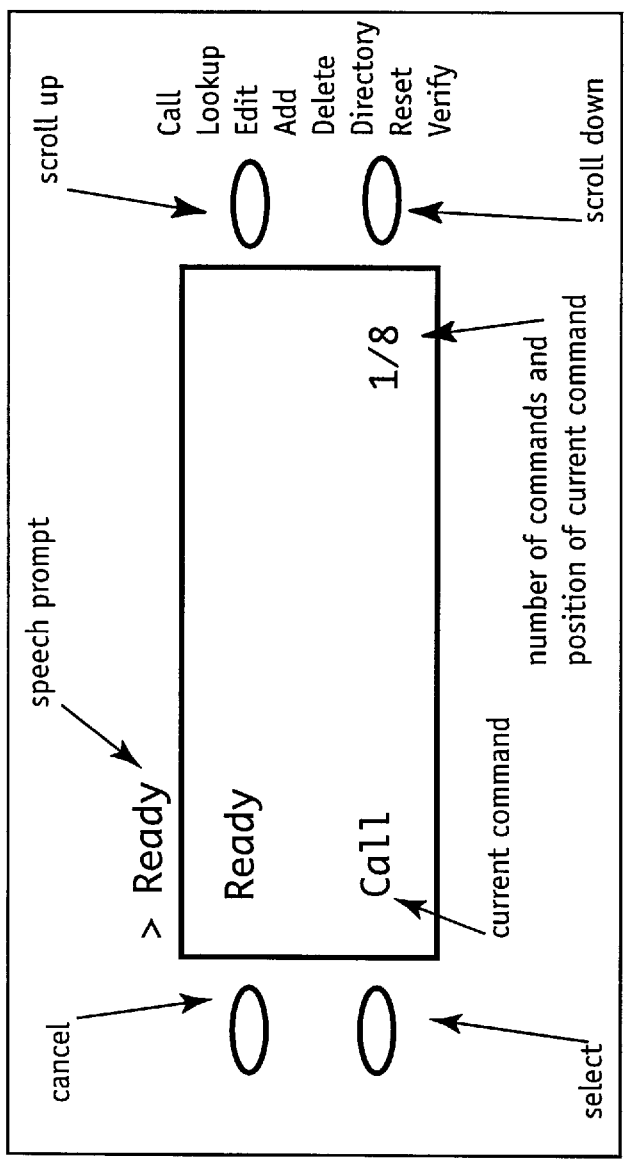
FIGS. 2a and 2b (collectively referred to as FIG. 2) are views of alternative displays that may be used in the telephone of FIG. 1.
Figure 2B:
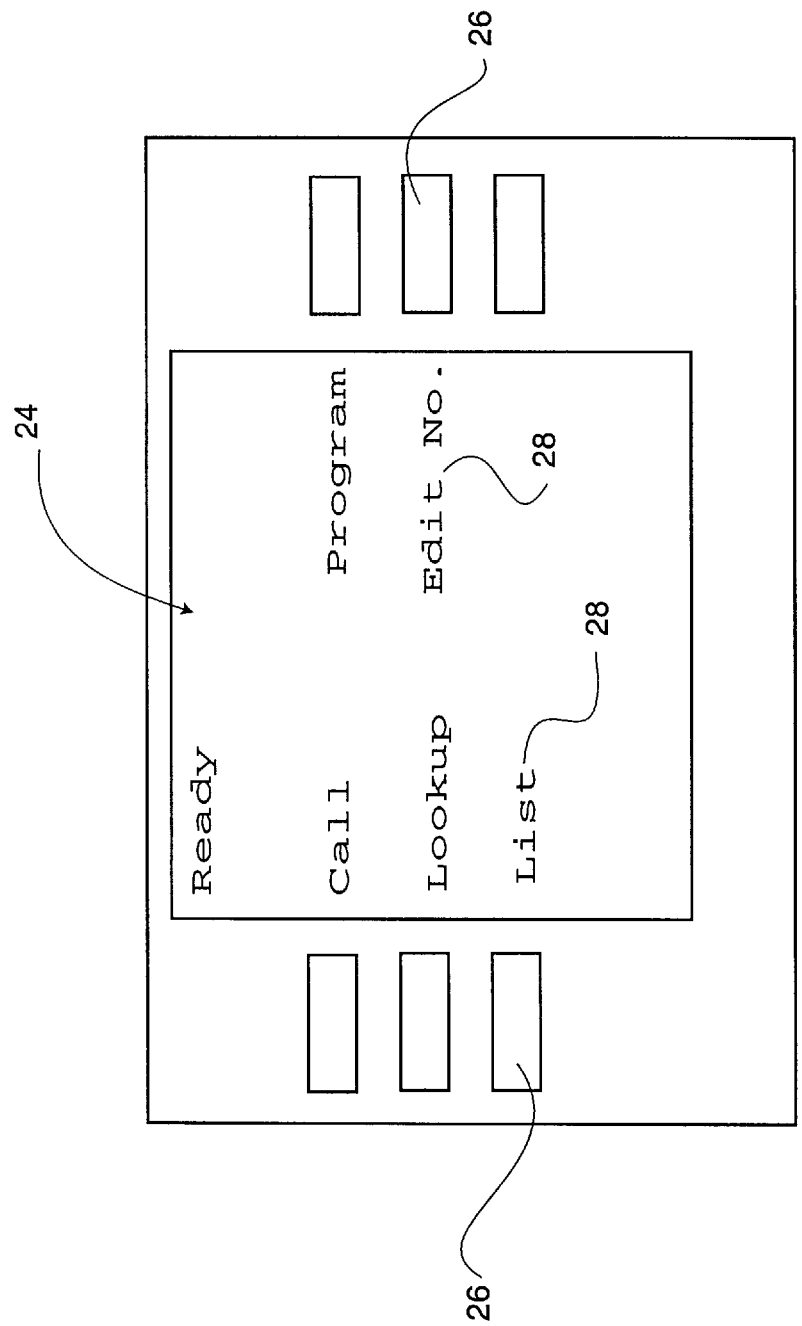

The telephone 10 also includes a liquid crystal display (LCD) 24 that displays commands entered through a plurality of buttons or keys 26. The size of the display will depend upon the styling and functionality desired. The presently preferred embodiment uses a two line LCD, shown in greater detail in FIG. 2a. The LCD shown at 24 in FIG. 2a is a two line LCD capable of displaying a total of 16 characters on each line. An alternate seven line, 16 characters per line LCD is shown at 24 in FIG. 2b. The LCD provides contextual meaning for keys 26, shown at 28. The LCD 24 is also integrated with telephone voice recognition and processing circuitry to display telephone command prompts in response to keyed-in or voice commands, as will be described in detail below.

Figure 3:
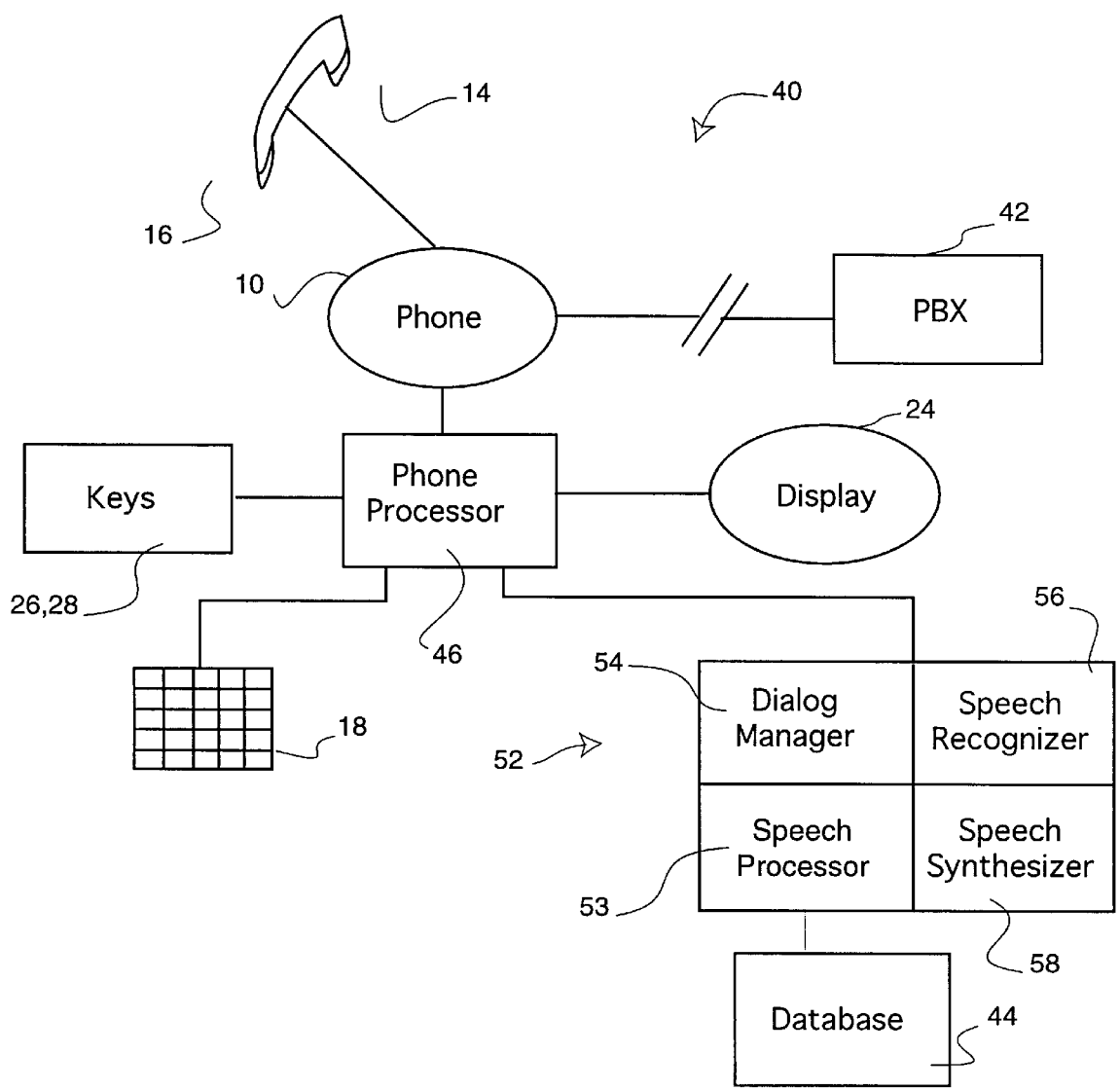
FIG. 3 is a block diagram of the components comprising the telephone shown in FIG. 1.

Referring to FIG. 3, an overall system block diagram of the components of the telephone 10 shown generally at 40. The telephone 10 communicates with a private branch exchange (PBX) 42, which in turn is connected to a public switched telephone network. However, the telephone 10 may be connected to the public switched telephone network directly or through well-known means other than the PBX 42.

Still referring to FIG. 3, the telephone also has a phone processor 46 that handles basic phone operation such as handling keypad input and writing to the display 24. The speech module 52 is connected to the phone processor 46 to add voice command capability to the telephone that functions in parallel with the LCD 24 in accordance with the present invention. The speech module includes a speech processor 53 that handles speech recognition, synthesis and operates the dialog manager. The speech processor 53 accesses database 44 to retrieve stored data used in interpreting the user's commands. Phone processor 46 is connected to the speech processor 53.

The speech module 52 also includes a speech recognizer 56, a speech synthesizer 58, and a dialog manager 54. The speech module can be implemented as a separate card that connects to the phone processor 46. The speech recognizer 56 is responsive to voice commands entered through the voice data entry device in accordance with the speech recognition logic described below. The speech synthesizer 56 provides audible prompts to the user through the microphone 16 in response to commands from the processor and the dialog manager 54.

As shown in FIG. 4, The database 44 is preferably constructed using a combination of read-only memory for static prompts and read/write nonvolatile memory for dynamic prompts. More specifically, the read-only memory stores the speaker-independent commands. These are key words that cause the system to perform various system functions identified in Table 1 below. The user may retrain these speaker-independent commands, replacing them with speaker-dependent commands that are then stored in the read/write memory. When a speaker retrains a command, the speaker-dependent command overrides the speaker-independent one. Speaker-dependent commands are entered through the microphone 16 of the telephone handset. The read-only memory also stores the phone models that are used by the speech recognizer 56. The read-only memory also stores static prompts. These are prompts that are supplied to the user via the LCD display 24. Dynamic prompts, representing prompts that can be altered by the user are stored in read/write memory. Also stored in read-write memory are the speaker-dependent names and associated telephone numbers that serve as the user's personal phonebook. Speaker-dependent names are entered using microphone 16; the associated telephone numbers are entered using keypad 18.

The database preferably has enough memory to store at least 100 names and telephone numbers, along with the other information illustrated in FIG. 4.

TABLE 1

KEYWORDS

| | |
|---|---|
| System | Add |
| Cancel | Delete |
| Call | Verify |
| Lookup | Reset |
| List | Restore |
| Program | Complete |
| Edit | All names |
| Yes | Adapt |
| No | Go back |
| Next one | |
| Restart | |

Figure 5:
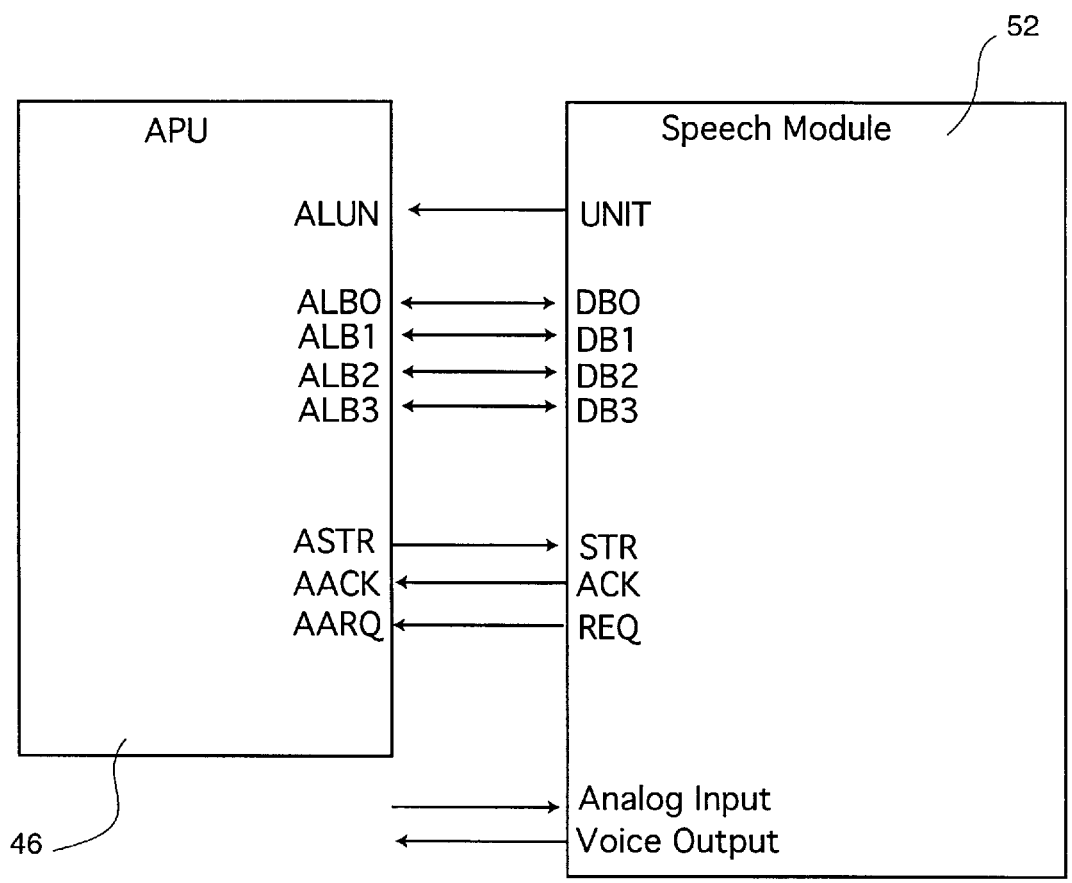
FIG. 5 is a schematic pin-out diagram of the processor and the speech card of the telephone of FIG. 1.

A schematic pin out diagram showing the interconnection of the processor 46 with the speech module 52 is shown in FIG. 5. Signal functions of the processor 46 and the speech module 52 are given below in Table 2.

TABLE 2

| SIGNAL | IN | OUT | FUNCTION | INT | ACT | NOTE |
|---|---|---|---|---|---|---|
| ALUN | X | X | Speech card unit sign | | L | L:Installed |
| ALB0 | X | X | Data D0 | | | |
| ALB1 | X | X | Data D1 | | | |
| ALB2 | X | X | Data D2 | | | |
| ALB3 | X | X | Data D3 | | | |
| ASTR | | X | Interface control signal | H | L | |
| AACK | X | | Speech card ACK signal | H | L | |
| AARQ | X | | Speech card access request signal | H | L | L:On access |

The digital voice telephone of the present invention may be operated through use of the keys 26 through voice commands processed by the speech module 52, or through a combination of both the keys and voice commands. Therefore, if, for some reason the speech module 52 is disabled, the telephone 10 may function as a conventional digital telephone without voice command capability.

Figure 6:
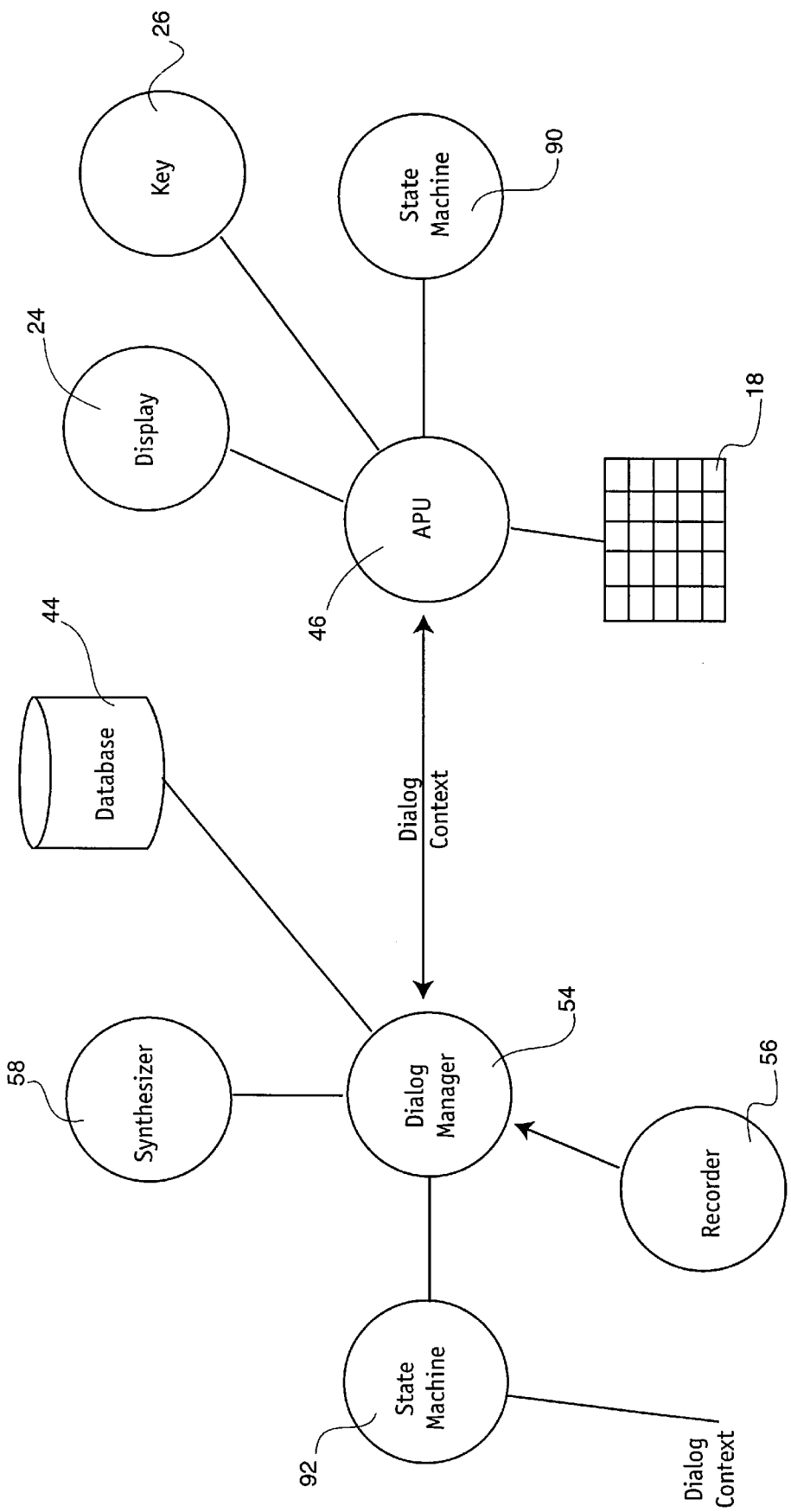
FIG. 6 is a data flow diagram showing the major functional components of the multimodal telephone system and how data flows among those systems.

Refer now to FIG. 6. FIG. 6 illustrates the major functional components of the multimodal telephone of the invention. The phone processor or APU 46 supports the display 24 and also the keypad 18. The speech module 52 comprises the dialog manager 54, including the speech recognizer 56 and speech synthesizer 58. If the speech module 52 is not connected to the APU 46, the APU 46 will nevertheless function as a standard touchtone telephone. The APU includes its own processor and associated memory that define a state machine 90. Specifically, state machine 90 describes the various telephone operating states that the user may place the telephone system in. These states include, for example, placing a call on hold, forwarding an incoming call to another number, transferring a call, and so forth. These states are typically those provided by conventional digital telephones for use with PBX systems. The keypad 18 serves as the user input to APU 46 and the display 24 serves as the user output.

The telephone of the present invention differs significantly from conventional digital telephones by virtue of the dialog manager 54 and its associated speech recognizer and speech synthesizer modules. The dialog manager is coupled to the APU to support bidirectional communication with the APU. The speech recognizer 56 serves as the user input and the speech synthesizer 58 serves as the user output. The dialog manager defines its own state machine 92. This state machine maintains the dialog context. That is, the dialog manager through its state machine 92 maintains a record of the current interaction between the user and the telephone, including how the user arrived at that point in the dialog, where applicable. For example, if the user has entered the command "call" followed by the name "Carl," the state machine 92 stores the fact that the user is attempting to place a call, as opposed to storing a telephone number for the party "Carl." The dialog context is used by the speech recognizer to help determine which is the most likely candidate for selection as the recognized word. Thus, in the preceding example, the speech recognizer would not confuse the word "Carl" for the word "call" because the word "Carl" followed the word "call," signifying that the word "Carl" is not a command but a name. The dialog context is also used to identify which commands are allowed at any given level in the dialog. By virtue of the bidirectional connection between the dialog manager 54 and the APU 46, the allowed commands at any stage in the dialog are also furnished to the display 24. This gives the user a visual indication of what are the possible commands at this point in the dialog.

The connection between dialog manager 54 and APU 46 ensures that these two processors operate in synchronism. Thus, if a user selects a soft key 26 associated with a given prompt on the display 24, that selection is sent to the dialog manager 54, where the information is used to cycle state machine 92 to the proper dialog context. Alternatively, if the user enters a verbal command that is recognized by speech recognizer 56, a dialog manager sends the command to APU 46, where it is carried out just as if the user had entered it through the soft key 26 or keypad 18. The dialog manager is capable of sophisticated processing of a user's input before transmitting control commands to the APU. For example, the dialog manager upon receipt of a command "call Carl" would look the name "Carl" up in database 44 and obtain the telephone number stored for that party. The dialog manager would then send commands to APU 46 that are interpreted by APU 46 as numeric digits entered via keypad 18. In this way, the telephone performs a voice dialing function.

Figure 7:
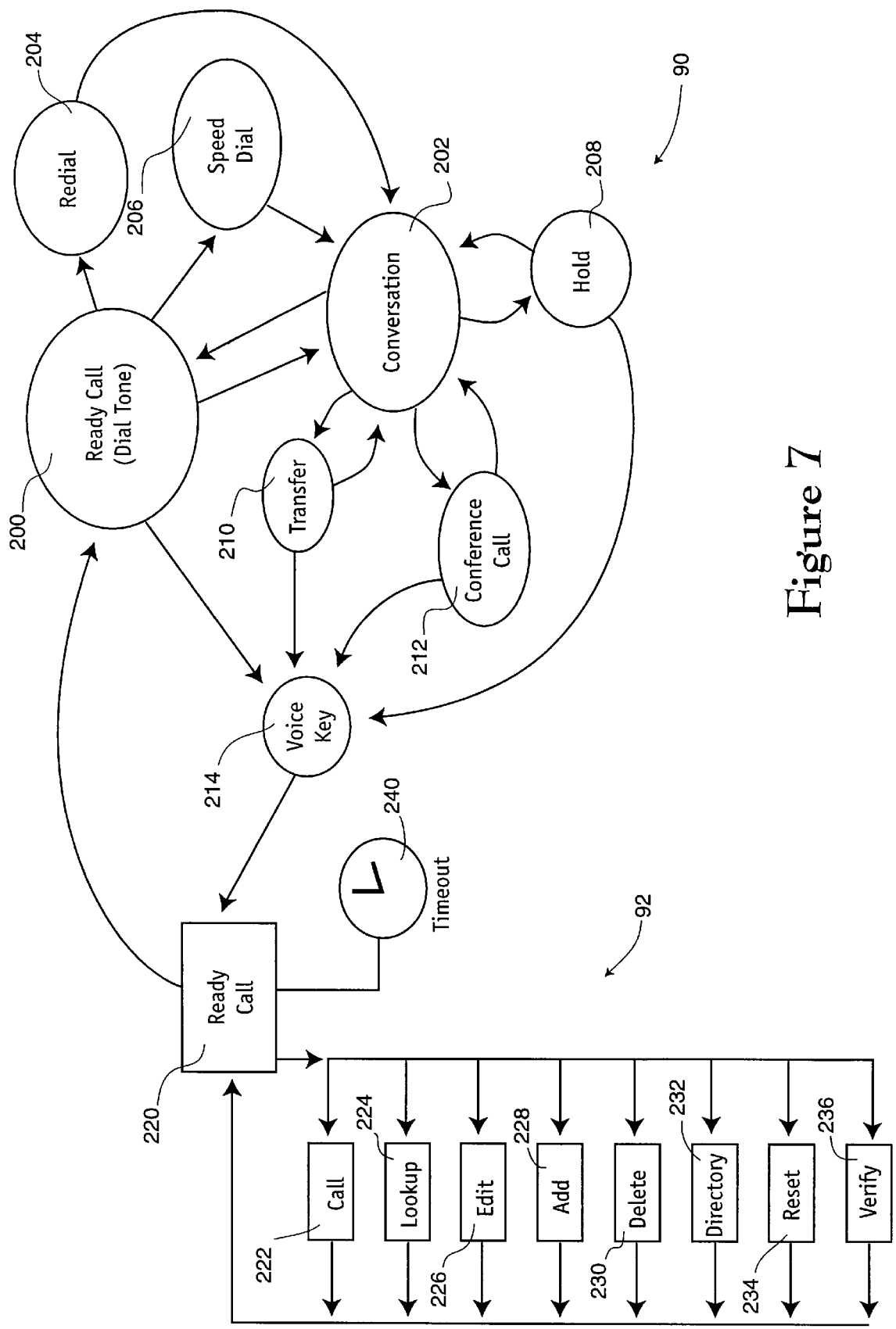
FIG. 7 is an overview of a state machine diagram depicting how the respective state machines of the phone processor and the dialog manager are integrated.

FIG. 7 shows in greater detail how the state machine 90 and state machine 92 integrate with one another. In FIG. 7 the states of state machine 90 are depicted using circles and the top level states of state machine 92 are depicted using rectangles. For example, when the user first lifts the handset of a telephone to use it, the state machine of APU 46 (state machine 90) is in the ready call state 200. The user will hear a dial tone through the speaker of the handset. From this state the user may use the keypad buttons 18 to dial a number and enter the conversation state 202. Alternatively, from the read call state 200 the user may activate the redial button on the telephone to enter redial state 204. In this state the APU automatically dials the last dialed number, whereupon the conversation state 202 is entered. Similarly, the user can press a speed dial button that has been previously programmed with a frequently used phone number. This causes the state machine 90 to enter state 206. In this state the APU dials the stored number and then enters the conversation state 202. While in the conversation state the user may press the hold button, causing the state machine to index to the hold state 208. While in the conversation state the user may also transfer a call by pressing the transfer button on the telephone, causing state machine 90 to index to the transfer state 210. Similarly, while in the conversation state, the user can press the conference call button, causing the state machine to index to the conference call state 212. The transfer and conference call buttons place the call on hold while allowing the user to establish contact with another party.

The presently preferred telephone unit includes as one of its function key buttons, a voice key button that, when activated from certain states, will invoke the services of the dialog manager and its associated state machine 92. In FIG. 7 the voice key state 214 may be entered from some (but not all) of the states of state machine 90. As illustrated, the voice key state 214 may be entered from the ready call state 200, from the hold state 208, from the transfer state 210 and from the conference call state 212. Entering this state, in effect, activates the dialog manager. The dialog manager begins in the ready call state 220, which is the primary access point for the remaining states of state machine 92 illustrated at 222–236. Each of the states of state machine 92 are described in detail in connection with FIGS. 8 and 9.

From a functional standpoint, the ready call state 200 of state machine 90 and the ready call state 220 of state machine 92 coincide. Stated differently, when the voice key state is entered, the functional states 222–236 of state machine 92 are, in effect, added to the functionality of the telephone unit as defined by state machine 90. Thus, for example, from the call state 222, the dialog manager will obtain the name to lookup by performing speech recognition, look up the name in the database and then dial the number by sending the appropriate dialing commands to the APU. Having done this, the system would then be in the conversation state 202, just as if the user had manually dialed the number from the ready call state 200. Although some of the functional states 222–236 of state machine 92 will cause state changes to occur in state machine 90 (as the voice dialing function does), not all of the them do. However, state machine 92 serves the additional function of maintaining a record of the current dialog context; that is, the context in which the user's input is to be interpreted. The dialog manager maintains a data structure that defines the possible states of state machine 92 as well as how those states are hierarchically related. This data structure thus serves to define what commands are possible from any given state within the state machine. The dialog manager maintains a pointer to the currently active state (that is, the state that the user most recently selected). Knowing the currently active state, the dialog manager consults the data structure to determine what are the possible operations that can be performed from the active state and what prompts are appropriate for the active state. The dialog manager communicates the dialog context to the phone processor that in turn displays what commands are possible upon the liquid crystal display. In this way, the user will always know what commands are possible by looking at the LCD display.

The presently preferred implementation will automatically revert from the ready call state 220 to the ready call state 200 after a predetermined time has elapsed without any action being taken. This is illustrated diagrammatically by the timer 240 in FIG. 7. The timeout duration will depend on the particular dialog context. For example, the system will wait for a longer time (e.g. 2 minutes) in the top level states, such as the ready call state 220. The system will wait a shorter time (e.g. 2 seconds) when the system is in a lower state that provides a default action to automatically take place if the user does not respond.

Figure 8:
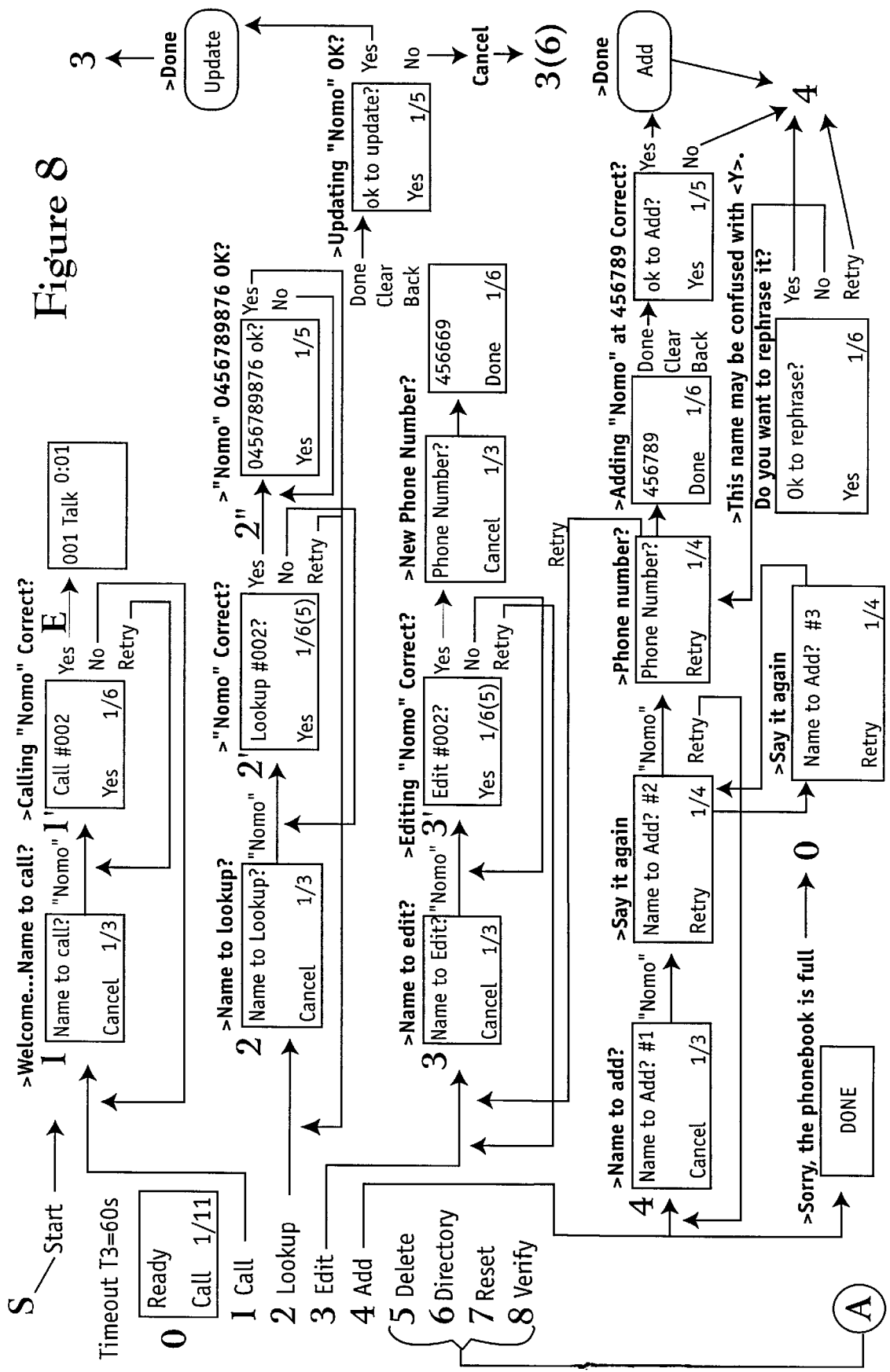
FIGS. 8 and 9 collectively represent the state machine of the dialog manager, showing what control function states are possible in the preferred embodiment and how those states are hierarchically arranged.
Figure 9:
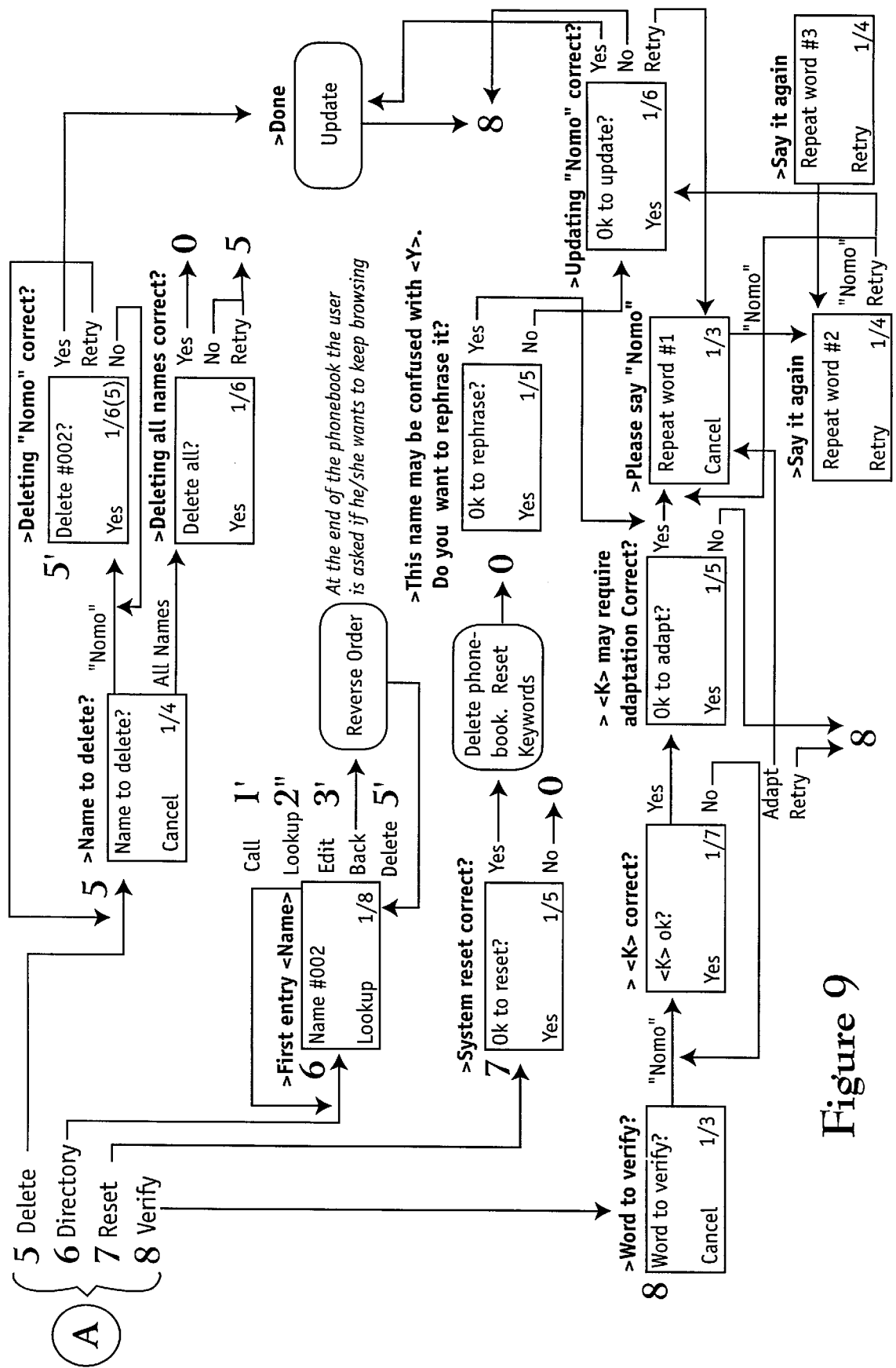

The state machine 92 of the presently preferred embodiment is illustrated in FIGS. 8 and 9. As indicated above, state machine 92 is implemented by the dialog manager 54. Essentially, dialog manager 54 augments the states available through the APU 46 (state machine 90) with additional states (state machine 92). By virtue of the bidirectional link between the dialog manager and the APU, these two state machines work in full synchronism with one another. However, because state machine 92 adds functionality to the telephone system that is not found in the APU-driven system alone, state machines 90 and 92 do not entirely overlap one another.

Referring to FIGS. 8 and 9, the ready call state 220 serves as the starting point from which the basic top level functional states 222–236 can be selected. See pseudocode in Appendix for an example of how this top level state may be programmed. Each of these functional states leads to a plurality of additional states that the user will enter and exit while conducting a dialog with the dialog manager. The timeout timer 240 (FIG. 7) is set at every state in the dialog unless otherwise specified. In the state diagrams of FIGS. 8 and 9, the designation "K" stands for "keyword." In the preferred embodiment, the commands displayed on the LCD are listed by decreasing likelihood order. The preferred embodiment uses soft keys to effect scroll up and scroll down functions, allowing the user to view more options than can be displayed at any one time on the liquid crystal display screen. By using a list display technique, the system can be easily upgraded to add additional commands or functions, simply by adding those additional keywords to the displayed list. This approach avoids the necessity of reprogramming the entire state machine system when new functions are added.

Figure 10:
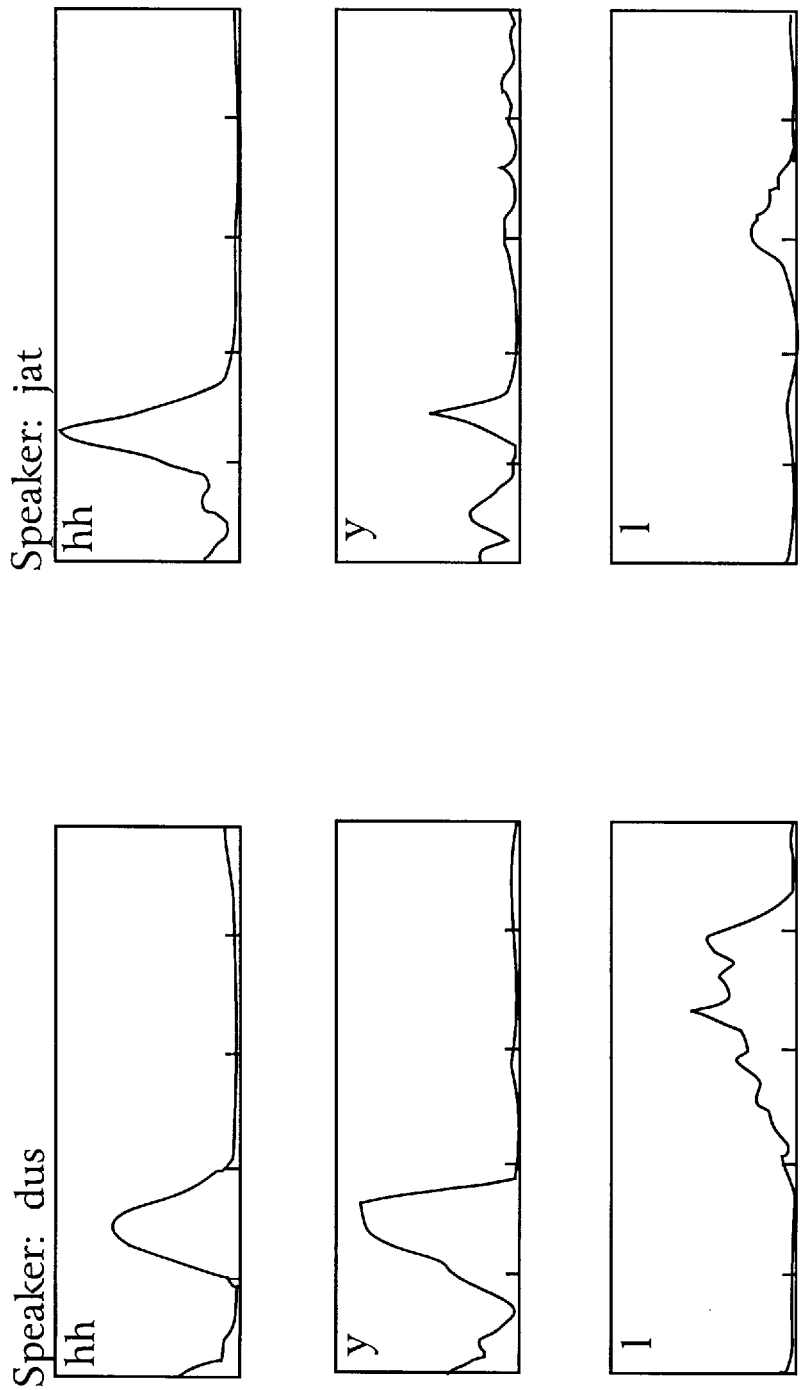
FIG. 10 is a phoneme similarity time series for the word "hill" spoken by two speakers.

The present invention employs a unique compact speech representation based on regions of high phoneme similarity values. As shown in FIG. 10, there is an overall consistency in the shape of the phoneme similarity time series for a given word. In FIG. 10 phoneme similarity time series for the word "hill" spoken by two speakers are compared. Although the precise wave shapes differ between the two speakers, the phoneme similarity data nevertheless exhibit regions of similarity between the speakers. Similar behavior is observed in the phoneme plausibility time series that has been described by Gong and Haton in "Plausibility Functions in Continuous Speech Recognition: The VINICS System," *Speech Communication*, Vol. 13, October 1993, pp. 187–196.

Conventional speech recognition systems match each input utterance to reference templates, such as templates composed on phoneme similarity vectors, as in the model speech method (MSM) of Hoshimi et al. In these conventional systems the reference speech representation is frame-based and requires a high data rate, typically 8 to 12 parameters every 10 to 20 milliseconds. The frame-by-frame alignment that is required with these conventional systems is computationally costly and makes this approach unsuitable for larger vocabularies, especially when using small hardware.

Figure 11:
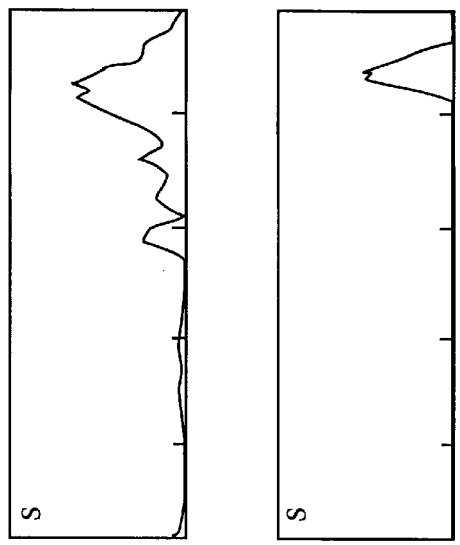
FIG. 11 is a series of graphs showing the output of the region picking procedure whereby similarity values are converted into high similarity regions.
Figure 11:
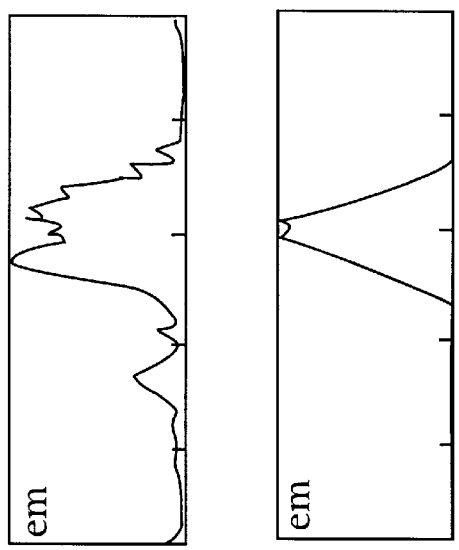

The present system uses a multistage word recognizer that is applied prior to a frame-by-frame alignment, in order to reduce the search space and to achieve real time performance improvements. The number of stages in the recognizer, as well as the computational complexity of each stage and the number of word candidates preserved at each stage, can be adjusted to achieve desired goals of speed, memory size and recognition accuracy for a particular application. The word recognizer uses an initial representation of speech as a sequence of multiple phoneme similarity values. However, the word recognizer further refines this speech representation to preserve only the interesting regions of high phoneme similarity. Referring to FIG. 11, the interesting regions of high phoneme similarity value are represented as high similarity regions. By representing the speech as features at a lower data rate in the initial stages of recognition, the complexity of the matching procedure is greatly reduced.

The multistage word recognizer also employs a unique scoring procedure for propagating and combining the scores obtained at each stage of the word recognizer in order to produce a final word decision. By combining the quasi-independent sources of information produced at each stage, a significant gain in accuracy is obtained.

The system's architecture features three distinct components that are applied in sequence on the incoming speech to compute the best word candidate.

Figure 12:
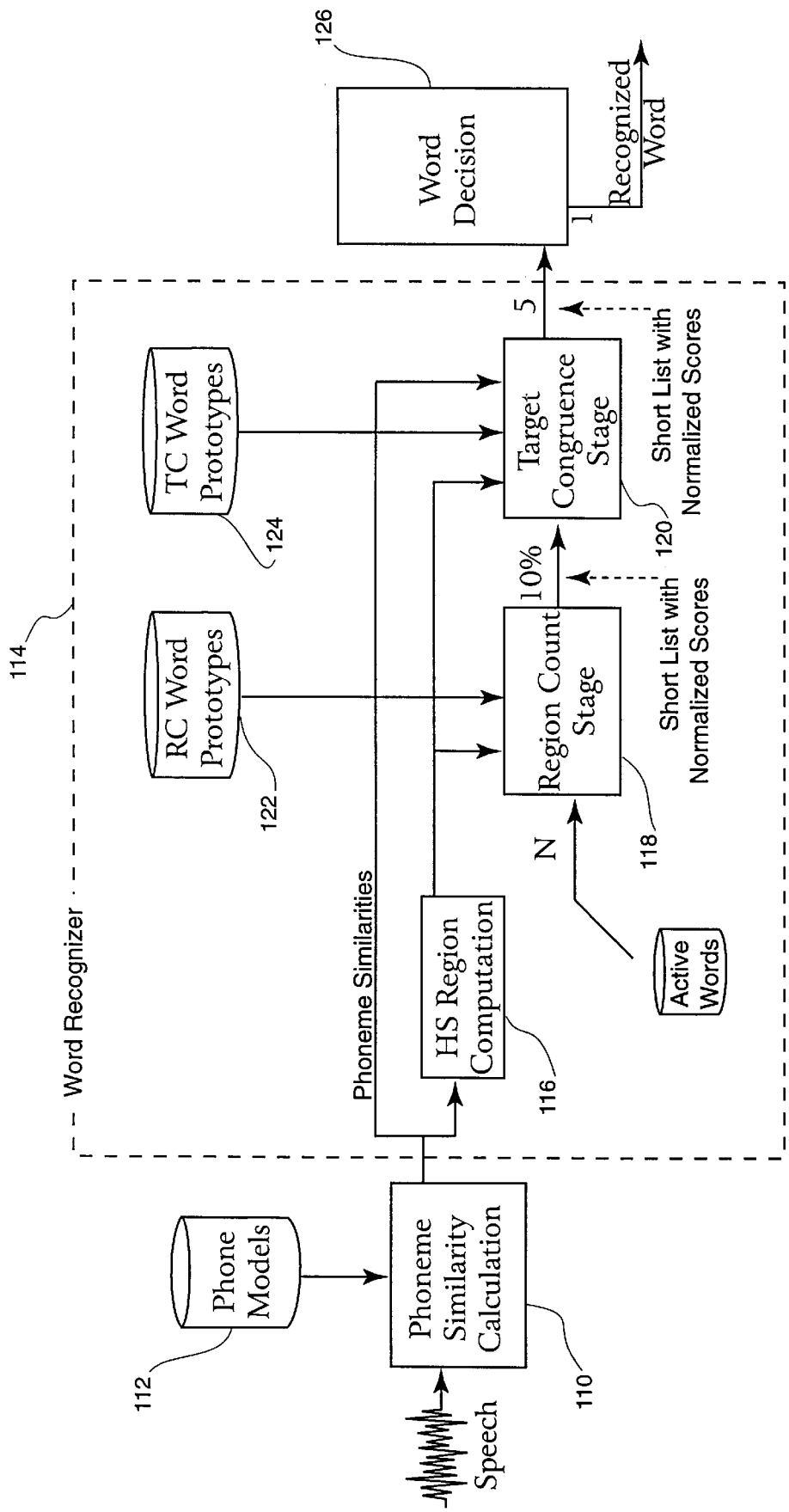
FIG. 12 is a block diagram of the presently preferred word recognizer system.

Referring to FIG. 12, an overview of the presently preferred system will be presented. The first component of the present system is a phoneme similarity front end 110 that converts speech signals into phoneme similarity time series. Speech is digitized at 8 kilohertz and processed by 10th order linear predictive coding (LPC) analysis to produce 10 cepstral coefficients every 100th of a second. Each block of 10 successive frames of cepstral coefficients is compared to 55 phoneme reference templates (a subset of the TIMIT phoneme units) to compute a vector of multiple phoneme similarity values. The block of analysis frames is then shifted by one frame at a time to produce a vector of phoneme similarity values each centisecond (each 100th of a second). As illustrated in FIG. 12, the phoneme similarity front end works in conjunction with a phone model database 112 that supplies the phoneme reference templates. The output of the phoneme similarity front end may be stored in a suitable memory for conveying the set of phoneme similarity time series so generated to the word recognizer stages.

The word recognizer stages, depicted in FIG. 12 generally at 114, comprise the second major component of the system. A peak driven procedure is first applied on the phoneme similarity time series supplied by front end 110. The peak driven procedure extracts High Similarity Regions (HS Regions). In this process, low peaks and local peaks of phoneme similarity values are discarded, as illustrated in FIG. 11. In the preferred embodiment regions are characterized by 4 parameters: phoneme symbol, height at the peak location and time locations of the left and right frames. Over our data corpus, an average of 60 regions per second of speech is observed. In FIG. 12 the high similarity region extraction module 116 performs the peak driven procedure. The output of the HS region extraction module is supplied to two different word recognizer stages that operate using different recognizer techniques to provide a short list of word candidates for the fine match final recognizer stage 126.

The first of the two stages of word recognizer 114 is the Region Count stage or RC stage 118. This stage extracts a short list of word candidates that are then supplied to the next stage of the word recognizer 114, the Target Congruence stage or TC stage 120. The RC stage 118 has an RC word prototype database 122 that supplies compact word representations based on the novel compact speech representation (regions of high phoneme similarity values) of the invention. Similarly, the TC stage 120 also includes a TC word prototype database 124 that supplies a different compact word representation, also based on the compact speech representation of the invention. The TC stage provides a more selective short list of word candidates, essentially a further refinement of the list produced by the RC stage 118.

The word decision stage 126, the final major component of the present system selects the word with the largest score from the short list supplied by TC stage 120.

Region Count Modeling

The RC stage 118 of word recognizer 114 represents each reference word with statistical information on the number of HS regions over a predefined number of time intervals. The presently preferred embodiment divides words into three equal time intervals in which each phoneme interval is described by (1) the mean of the number of HS regions occurring in that interval and (2) a weight that is inversely proportional to the square of the variance, which indicates how reliable the region count is. Specifically for a score normalized between 0 and 100, the weight would be $100/(\text{variance}^2+2)$. These parameters are easily estimated from training data. In the currently preferred implementation, each word requires exactly 330 parameters, which corresponds to two statistics, each over three intervals each comprising 55 phoneme units (2 statistics×3 intervals×55 phoneme units).

Region count modeling was found to be very effective due to its fast alignment time (0.33 milliseconds per test word on a Sparc10 workstation) and its high top 10% accuracy.

The region count prototype is constructed as follows. A first utterance of a training word or phrase is represented as time-dependent phoneme similarity data. In the presently preferred embodiment each utterance is divided into N time intervals. Presently each utterance is divided into three time intervals, with each time interval being represented by data corresponding to the 55 phonemes. Thus the presently preferred implementation represents each utterance as a 3×55 vector. In representing the utterance as a 3×55 vector, each vector element in a given interval stores the number of similarity regions that are detected for each given phoneme. Thus if three occurrences of the phoneme "ah" occur in the first interval, the number 3 is stored in the vector element corresponding t the "ah" phoneme.

An inductive or iterative process is then performed for each of the successive utterances of the training word or phrase. Specifically, each successive utterance is represented as a vector like that of the first utterance. The two vectors are then combined to generate the vector sum and the vector sum of the squares. In addition, a scalar count value is maintained to keep track of the current number of utterances that have been combined.

The process proceeds inductively or iteratively in this fashion, each new utterance being combined with the previous ones such that the sum and sum of squares vectors ultimately represent the accumulated data from all of the utterances.

Once all training utterances have been processed in this fashion the vector mean and vector variance are calculated. The mean vector is calculated as the sum vector divided by the number of utterances used in the training set. The vector variance is the mean of the squares minus the square of the means. The mean and variance vectors are then stored as the region count prototype for the given word or phrase. The same procedure is followed to similarly produce a mean and variance vector for each of the remaining words or phrases in the lexicon.

When a test utterance is compared with the RC prototype, the test utterance is converted into the time dependent phoneme similarity vector, essentially in the same way as each of the training utterances were converted. The Euclidean distance between the test utterance and the prototype is computed by subtracting the test utterance RC data vector from the prototype mean vector and this difference is then squared. The Euclidean distance is then multiplied by a weighting factor, preferably the reciprocal of the prototype variance. The weighted Euclidean distance, so calculated, is then converted into a scalar number by adding each of the vector component elements. In a similar fashion the weighting factor (reciprocal of the variance) is converted into a scalar number by adding all of the vector elements. The final score is then computed by dividing the scalar distance by the scalar weight.

The above process may be repeated for each word in the prototype lexicon and the most probable word candidates are then selected based on the scalar score.

Target Congruence Modeling

The second stage of the word recognizer represents each reference word by (1) a prototype which consists of a series of phoneme targets and (2) by global statistics, namely the average word duration and the average "match rate," which represents the degree of fit of the word prototype to its training data. In the presently preferred embodiment targets are generalized HS regions described by 5 parameters:

1. phoneme symbol;
2. target weight (percentage occurrence in training data);
3. average peak height (phoneme similarity value);
4. average left frame location;
5. average right frame location.

Word prototypes are automatically created from the training data as follows. First, HS regions are extracted from the phoneme similarity time series for a number of training speakers. The training data may be generated based on speech from a plurality of different speakers or it may be based on multiple utterances of the same training words by a single speaker. Then, for each training utterance of a word, reliable HS regions are computed by aligning the given training utterance with all other utterances of the same word in the training data. This achieves region-to-region alignment.

For each training utterance the number of occurrences (or probability) of a particular region is then obtained. At that time, regions with probabilities less than a pre-established Reliability Threshold (typically 0.25) are found unreliable and are eliminated. The word prototype is constructed by merging reliably detected, high similarity regions to form targets. At the end of that process a target rate constraint (i.e. desired number of targets per second) is then applied to obtain a uniform word description level for all the words in the lexicon. The desired number of targets per second can be selected to meet system design constraints such as the ability of a given processor to handle data at a given rate. By controlling the target rate a reduction in the number of targets is achieved by keeping only the most reliable targets. Once the word prototype has been obtained in this fashion, the average match rate and average word duration are computed and stored as part of the word prototype data.

The number of parameters needed to represent a word depends on the average duration of the word and on the level of phonetic detail that is desired. For a typical 500 millisecond word at 50 targets per second, the speech representation used by the presently preferred embodiment employs 127 parameters, which correspond to 5 values per target×50 targets per second×0.5 seconds+2 global statistics (average match rate and average word duration).

Figure 13:
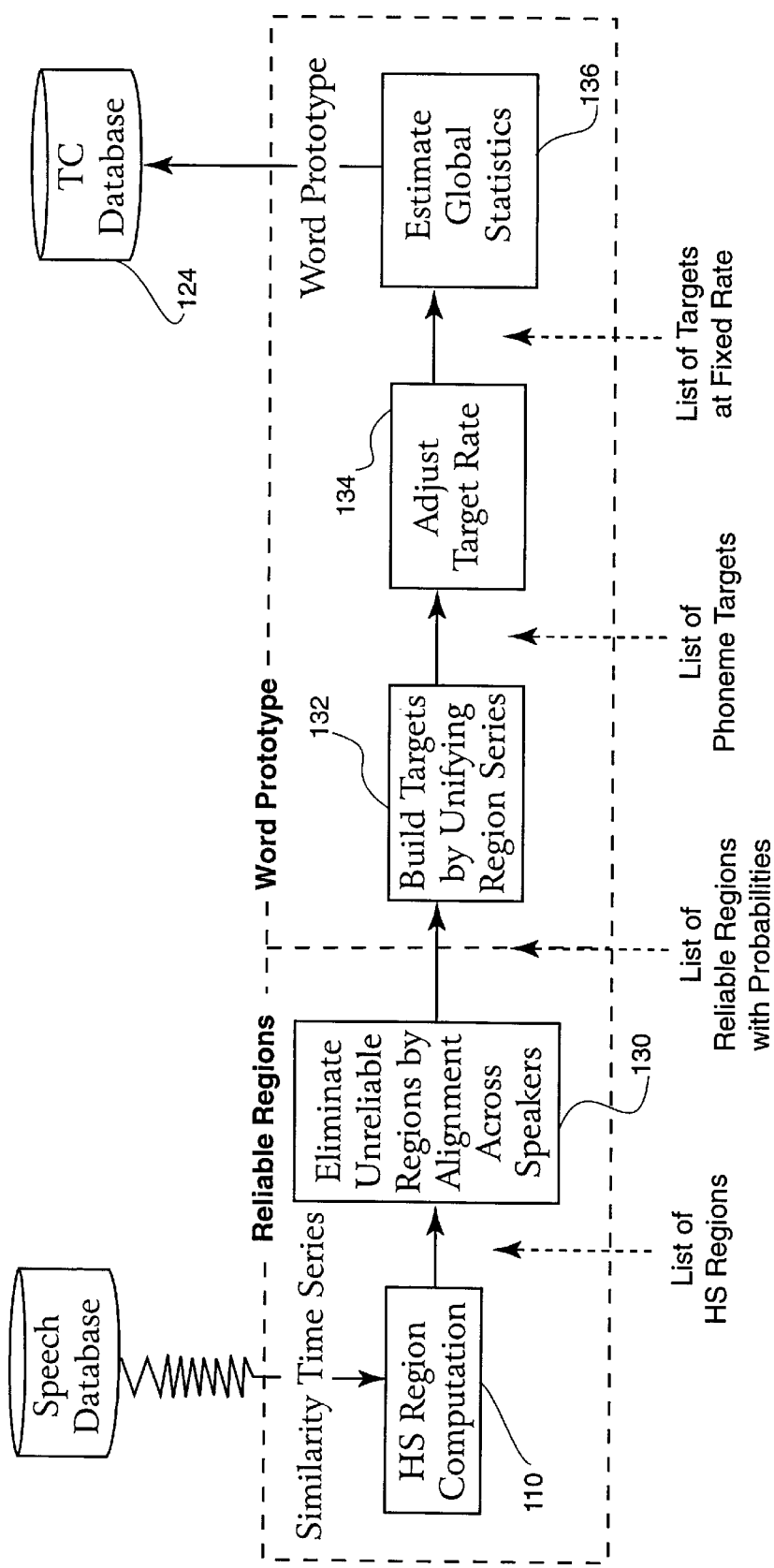
FIG. 13 is a block diagram illustrating the target congruence word prototype training procedure.

FIG. 13 illustrates the word prototype training procedure by which the TC word prototype database 124 is constructed. The RC word prototype database 122 is constructed by similar, but far simpler process, in that only the presence or absence of an HS region occurring with each of the three equal time intervals must be detected.

Referring to FIG. 13, the HS Region Computation Module 116 is used to convert the similarity time series from the speech database into a list of HS regions. The alignment module 130 operates on this list of HS regions to eliminate unreliable regions by alignment across speakers. Again, the process can be performed across a plurality of different speakers or across a plurality of utterances by the same speaker.

Next the list of reliable regions, together with the associated probabilities of detecting those regions is passed to the target building module 132. This module builds targets by unifying the region series to produce a list of phoneme targets associated with each word in the database. This list of phoneme targets is then supplied to a module 134 that adjusts the target rate by applying the target rate constraint. The target rate constraint (the desired number of targets per second) may be set to a level that achieves the desired target rate. After adjusting the target rate a statistical analyzer module 136 estimates the global statistics (the average match rate and the average word duration) and these statistics along with the list of targets at the selected rate are then stored as the TC word prototype database 124.

Word Recognition

Given an active lexicon of N words, the region count stage is first applied to produce a short list of word candidates with normalized scores. A weighted Euclidean distance is used to measure the degree of fit of a test word X to a reference word P (in RC format as supplied by the RC word prototype database). Specifically, in the current implementation the weighted Euclidean distance is defined as $$D_{RC}(X, P) = \sum_{i=1}^{3} \sum_{j=1}^{55} (x_{ij} - p_{ij})^2 w_{ij} / \sum_{i=1}^{3} \sum_{j=1}^{55} w_{ij}$$

where $x_{ij}$ is the number of HS regions in time interval I for phoneme j, where $P_{ij}$ is the corresponding average number of HS regions estimated on training data, and where $w_{ij}$ is the corresponding weight. The N/10 highest scoring word prototypes are preserved as word candidates and their scores (weighted Euclidean distances) are normalized by dividing each individual score by the highest score. This defines a normalized score $S_{RC}$ for each word. Normalized scores range from 0 to 1 and are dimensionless, making it possible to combine scores resulting from different scoring methods.

The target congruence stage is then applied on each word candidate selected by the RC stage. A region-to-target alignment procedure is used to produce a congruence score between the test word and a given word reference (in TC format as supplied by the TC word prototype database). The congruence score of a matched target CGmatch, that is, the alignment found between target t of the prototype and region r of the test word, is defined as $$CG_{match}(t,r) = min(A_t/A_r, A_r/A_t)$$

where $A_t$ and $A_r$ respectively represent the target's area and the aligned region's area in the time similarity plane.

The congruence score of an unmatched target CGunmatch is computed in the same way, using an estimate for the area $A_r$ of the missing HS region. The estimated area $A_r$ is computed as the area under the similarity curve for the target's phoneme label, between the projected locations of the target's left and right frames.

The word congruence score is computed as the weighted sum of congruence scores for all the targets, divided by the sum of their weights. Normalized congruence scores $S_{TC}$ are computed by dividing the individual congruence scores by the highest congruence score. The final score output by the word recognizer is a combination of the information obtained at each recognizer stage. In the presently preferred embodiment the final score output of the recognizer is:

$$S_{Hypo} = (S_{RC} + S_{TC})/2$$

APPENDIX

```
int VTAutomaton
(
int State
)
{
CandidateList *List;
SpeechSignal *SimSgl;
SimilaritySignal *SimSgl;
int WordIndex;
int SimilarityScore;
int SimilarityScore1;
int SimilarityScore2;
Boolean Ok;
int NbrPhrases;
DialogueContext DlgCtx;
int NextState;
unsigned char Mask;
UtteranceTrainingList *TrainingList;
int ID;
int Ix;
int NextNameIndex;
EmulationEvent Event;
char Buffer[DEFSTR+1];
char Format[DEFSTR+1];
int OffSet;
static WordModel *Model=NULL;
static CandidateList *NameList=NULL;
static SpeechSignal *Rep=NULL;
static SimilaritySignal *SimRep1=NULL;
static SimilaritySignal *SimRep2=NULL;
static SimilaritySignal *SimRep3=NULL;
static char Digit;
static unsigned char KeyCode;
static int Direction;
static char GivenName[DEFSTR+1];
static char GivenNumber[DEFSTR+1];
static int Index;
static int NameIndex;
static String Name;
static char Number[DEFSTR+1];
static int FirstNameIndex;
static int LastNameIndex;
static int IdleCount;
static int NumberIndex;
SpcSgl=MallocSpeechSignal();
SimSgl=MallocSimilaritySignal();
List=MallocCandidateList();
NameList=(*Scrpt).NameList;
switch (State)
 {
  case VTS_BOOT:
   {
    NextState=VTS_BOOT_INITIATE
   } break;
   case VTS_BOOT_INITIATE:
   {
    printf("WAITING FOR SETUP\n");
    InitDialogueContext(&DlgCtx,NODEF);
    DlgCtx.EmuCtx.SetupState=VTS_BOOT_CONFIGURE;
    GetInput(&DigCtx,State,&NextState,List,SpcSgl,SimSgl,&Event);
   } break;
   case VTS_BOOT_CONFIGURE:
   {
    UpdateEmulationFunctionBuffer(FUNCTION_OVERRIDE_OFF);
    UpdateEmulationFunctionBuffer(FUNCTION_KEYAS_COMMAND);
    UpdateEmulationFunctionBuffer(FUNCTION_ACTIVATION_HANDSET);
    SendEmulationFunctionBuffer();
    NextState=VTS_WAIT;
   } break;
   case VTS_INTERRUPT:
    {
    ClearLCD();
    UpdateEmulationLEDDisplayBuffer(LED_START_LED#OFF);
    SendEmulationLEDDisplayBuffer();
    NextState=VTS_WAIT;
   } break;
   case VTS_WAIT:
    {
```

-continued

APPENDIX

```
  Mask=GetHandsetStatus();
  if(Mask==STATUS_HANDSET_OFF)
  {
    NextState=VTS_WAIT_HANDSET
  }
  else
  {
    }NextState=VTS_WAIT_START;
} break;
case VTS_WAIT_HANDSET:
{
 printf("WAITING FOR HANDSET\n");
 InitDialogueContext(&DlgCtx,NODEF);
 DlgCtx.EmuCtx.HandSetOnStatusState=VTS_WAIT_START;
 GetInput(&DlgCtx,State,&NextState,List,SpcSgl,SimSgl,&Event);
} break;
case VTS_WAIT_START:
{
 printf("WAITING FOR ALIBABA MODE\n");
 InitDialogueContext(&DlgCtx,NODEF);
 DlgCtx.EmuCtx.ModeOnStatusState=VTS_WAIT_ENGAGE;
 DlgCtx.EmuCtx.HandSetOffStatusState=VTS_WAIT_HANDSET;
 GetInput(&DlgCtx,State,&Nextstate,List,SpcSgl,SimSgl,&Event);
} break;
case VTS_WAIT_ENGAGE:
{
 UpdateEmulationLEDDisplayBuffer(LED_START_LED_ON);
 SendEmulationLEDDisplayBuffer();
 ClearLCD();
 DisplayLCD(LCD_LINE_1, "WELCOME... ");
 PlayMessage("Welcome");
 NextState=VTS_CALL;
} break;
caseVTS_TOP:
```

What is claimed is:

1. A multimodal telephone comprising:

a telephone unit having a microphone and speaker for supporting voice communication by a user;

a visual display device disposed on said telephone unit, the display adapted for displaying a plurality of different command prompts to the user;

at least one programmable function key for enabling entry of keyed commands, said function key disposed on said telephone unit adjacent said visual display such that at least a portion of said command prompts are displayed approximately adjacent said function key;

a speech module disposed within said telephone unit, the speech module including a speech recognizer and a speech generator, the speech module being coupled to said telephone unit so that said speech recognizer is responsive to voiced commands entered through said microphone and said speech synthesizer provides audible prompts through said speaker;

a dialog manager coupled to said visual display, to said function key and to said speech module, said dialog manager defining a set of linked control function states each state associated with a respective one of said command prompts and at least a portion of said set of linked control function states being further associated with a respective one of said audible prompts;

said dialog manager being responsive to said voiced commands and to said function key to traverse said set of linked control function states to select one of said set of linked control function states as an active state;

said dialog manager being operative to maintain synchronism between said command prompts and said audible prompts such that the control function states linked to said active state are displayed as a command prompts and the user has the option to move from said active state to one of said control function states linked to said active state by either voiced command or keyed command; and wherein said dialog manager stores a dialog context and wherein said speech recognizer selects a plurality of word candidates in response to voiced commands and uses said dialog context to select among said plurality of word candidates.

2. The telephone of claim 1 wherein said set of linked control function states define a state machine and wherein said dialog manager administers said state machine.

3. The telephone of claim 1 wherein said speech module further includes a voice dialing module having database of user-defined names and phone numbers.

4. The telephone of claim 1 wherein said dialog manager stores a dialog context and wherein said dialog manager communicates said dialog context to said telephone.

5. The telephone of claim 1 wherein said dialog manager stores a dialog context and wherein said dialog manager communicates said dialog context to said telephone unit for presentation on said visual display.

6. The telephone of claim 4 wherein said telephone unit includes a phone processor coupled to said visual display and wherein said dialog manager communicates said dialog context to said phone processor.

7. The telephone of claim 1 wherein said speech recognizer represents speech as high phoneme similarity values.

8. The telephone of claim 1 wherein said speech recognizer employs a region count stage that extracts a list of word candidates based on regions of high phoneme similarity values.

9. The telephone of claim 1 wherein said speech recognizer employs a target congruence stage that extracts a list of word candidates based on the alignment of regions of high phoneme similarity with word prototypes.

10. The telephone of claim 1 wherein said speech recognizer employs:
   a region count stage that extracts a first list of word candidates based on number regions of high phoneme similarity values, and
   a target congruence stage that extracts a second list of word candidates from said first list based on alignment of regions of high phoneme similarity values with word prototypes.

11. The telephone of claim 1 wherein said dialog manager includes a memory for storing a database comprising both speaker independent and speaker dependent information.

12. The telephone of claim 1 wherein said telephone unit includes a phone processor module programmed for operative communication with a telephone branch exchange system.

13. A multimodal telephone comprising:
   a telephone unit having a microphone for supporting voice communication by a user;
   a speech module coupled to said telephone unit, the speech module including a speech recognizer that is responsive to voiced commands entered through said microphone;
   a dialog manager coupled to said speech module that stores a dialog context and wherein said speech recognizer selects a plurality of word candidates in response to said voiced commands and uses said dialog context to select among said plurality of word candidates.

* * * * *